Aug. 29, 1961

P. E. BESSIERE 2,998,539

DEVICES FOR DRIVING, ESPECIALLY ALTERNATORS, AT SUBSTANTIALLY
CONSTANT SPEED FROM A VARIABLE SPEED SHAFT

Filed Dec. 11, 1958

INVENTOR

Pierre Etienne Bessière
BY
Bailey, Stephens & Huettig
ATTORNEYS

INVENTOR
Pierre Etienne Bessière
BY
Bailey, Stephens & Huettig
ATTORNEYS

United States Patent Office 2,998,539
Patented Aug. 29, 1961

2,998,539
DEVICES FOR DRIVING, ESPECIALLY ALTERNATORS, AT SUBSTANTIALLY CONSTANT SPEED FROM A VARIABLE SPEED SHAFT
Pierre Etienne Bessiere, Neuilly-sur-Seine, France, assignor to Precision Mecanique Labinal, Saint-Ouen (Seine), France, a society of France
Filed Dec. 11, 1958, Ser. No. 779,645
Claims priority, application France Dec. 16, 1957
13 Claims. (Cl. 310—99)

This invention relates to a device for driving, especially an alternator having a frequency which is constant, at least substantially, from a variable-speed driving shaft, said device comprising essentially a coupling by a differential, one of the elements of which is variably braked in accordance with the speed variations of the driving shaft by a Foucault-current brake, the inductor of which may be fed by a rectified current coming from the alternator.

The invention is characterised chiefly by the fact that the differential which is driven directly by the driving shaft, is placed, between the alternator and the Foucault-current brake, the latter being coaxial with the driving shaft, in the extension of which the driving shaft of the alternator is mounted, and the alternator and the Foucault-current brake, which are located on one side and the other of the differential, are coupled directly with the latter.

In a particularly advantageous embodiment, cooling air is passed to the position at which the differential is located and means are provided for dividing the air current, which has impinged the differential, into two parts, one of which passes over the brake and the other passes over the alternator.

Other features and advantages of the invention will appear from the description of a particular embodiment of the invention, which is represented in the accompanying drawings, of which:

Figure 1:
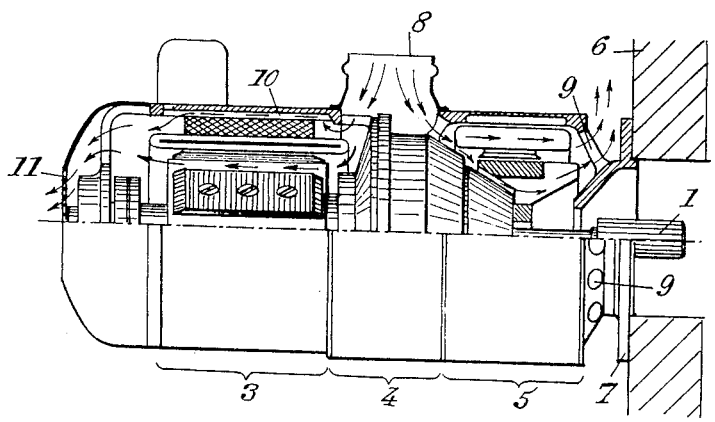
FIGURE 1 shows, with parts in section a device made in accordance with the invention.

When a driving shaft 1 rotating at a very variable speed is to drive the shaft 2 of an alternator 3 at a practically constant speed, this shaft 2 may be driven by the shaft 1 through a device comprising a differential 4 and a Foucault-current brake 5, the inductor of which is advantageously fed with a rectified current coming from the alternator 3.

Figure 2:
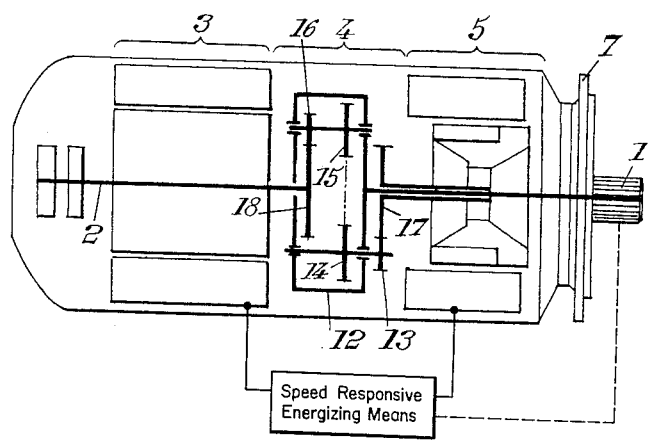
FIGURE 2 shows, diagrammatically, the kinematic connections between the different parts constituting the same device.

If the Foucault-current brake is energized by means of a current variable as a function of the variations of speed of the shaft 1 (energizing means diagrammatically shown in FIG. 2), it is possible to arrange for the alternator to rotate at a practically constant speed.

Now, according to the present invention, the driving shaft 1 is coupled directly with the differential 4, which is located between the alternator 3 and the Foucault-current brake 5 both of which are coupled directly with the said differential, in line therewith.

A particularly compact unit is thus obtained, which is capable of being cooled efficaceously by simple means and is easy to be fixed on a wall 6 by means of a flange 7 that the case of the unit has around the shaft 1.

In this unit, the brake, the differential and the alternator which, in this order, increase in their sensitivity to heat, are arranged in a normal order, in which they are spaced more and more from the fixing wall 6.

In order to ensure a good cooling for the said unit, it is convenient to blow a current of air through the case of the unit.

For this purpose, it is particularly advantageous to provide, at the periphery of the differential 4, in the casing of unit, an air inlet 8 which is common for two separate cooling paths which extend in opposite directions, as shown by the arrows in FIGURE 1. Thus the air, after having cooled the differential, is divided into two parts, one of which on the first path, cools the inductor and the rotor of the brake 5 and leaves the casing through openings 9 provided, around the flange 7, whilst the other part of the air passes round the rotor and the stator of the alternator 3 and in grooves 10 made at the periphery in the wall of the casing and leaves the latter through openings 11 provided at the end and near the axis of the unit.

Figure 4:
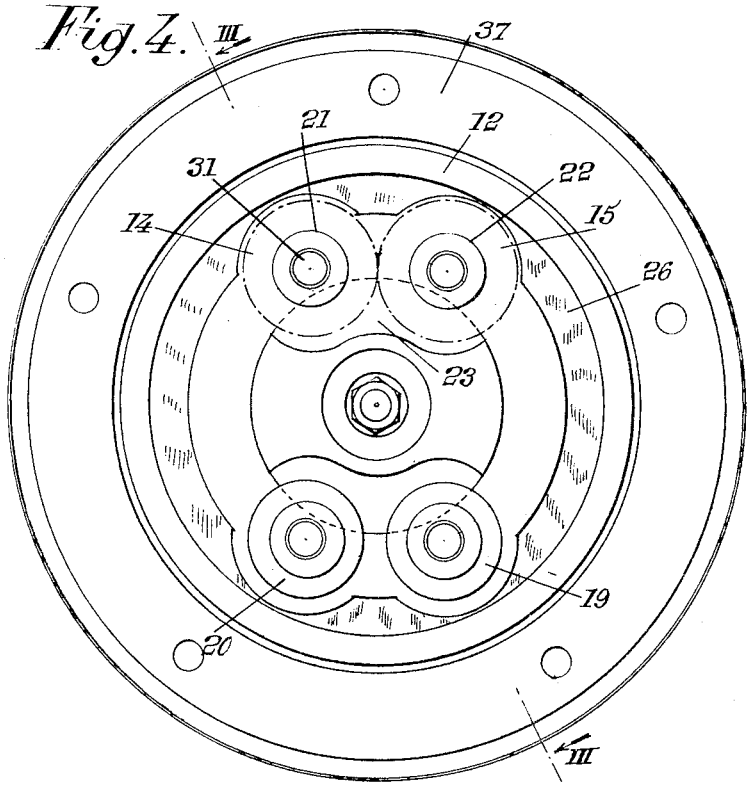
FIGURE 4 shows, in open end view, the planet wheel holder of the differential shown in FIGURE 3; and finally
Figure 5:
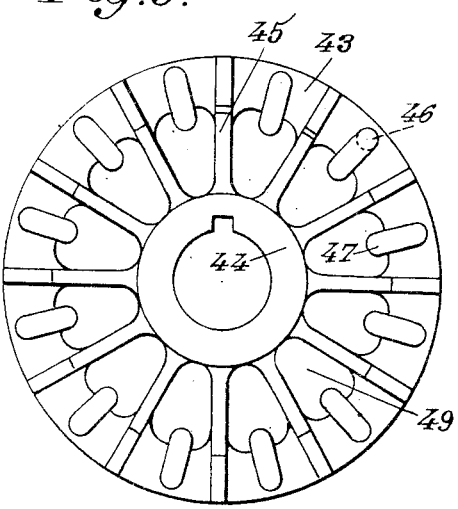
FIGURE 5 shows, in end view, the rotor of the Foucault-current brake of FIGURE 3.

Now, with regard more particularly to the differential of the device according to the invention, is comprises a planet wheel holder 12 which is driven, directly by the shaft 1 and in which is mounted at least one pair of units each consisting of twinned planet wheels 13—14 and 15—16. These planet wheel units mesh with each other by means of their planet wheels 14 and 15 (in the diagram of FIGURE 2, the planet wheels which, in reality, are mounted side-by-side as shown in FIGURE 4, have been represented spaced from one another in order to show the set of kinematic connections better). Furthermore of the other planet wheels, to wit 13 meshes with a pinion 17 of the shaft 36 of the rotor of the Foucault-current brake 5, and the other planet wheel 16 meshes with a pinion 18 which is integral with the shaft 2 of the alternator 3.

As the planet wheel units 13—14 and 15—16 are mounted in the holder 12 on the same side of the shaft 1, two balancing runners 19 and 20 are mounted, on the opposite side, in the holder 12.

By this mounting, in which the planet wheels 13 and 16 are rotated in opposite directions, a great differential-movement ratio between the pinions 17 and 18, that is to say between the brake 5 and the alternator 3, is obtained with a differential 4, even if its diameter is relatively small; this is obviously favourable for the good operation of a device of small dimensions. Other advantages of this mounting will appear from the following.

In the mounting of the differential, the arrangement is such that all the gear wheels 13, 14, 15, 16, 17 and 18 are toothed externally so that they can easily be rectified notwithstanding their relatively small dimensions.

Each planet wheel unit 13—14 or 15—16 is mounted on a socket 21 or 22 with a cylindrical bore and polygonal contour, on which the corresponding wheels are forcibly fitted.

In addition, it is advantageous to constitute, with the planet wheel holder 12, a case which envelops, as completely as possible, the gear wheels forming part of the differential 4, in order to keep round them the lubricant which is necessary for their good operation.

In the aforesaid mounting of the unit, the pinion 17 of the brake is necessarily located on the outside of the case 12 of the differential. In this case, it is convenient to have the case 12 surround the periphery of the pinion 17 and to provide, in the wall of the case, an opening 23 through which the planet wheel 13 projects in order to be able to mesh with the pinion 17.

In the wall of the internal circumference of the case 12, it is convenient to provide separate throats 25, 26 and 27 which are adapted, notwithstanding centrifugal force, to keep the lubricant against the different planet wheels which are mounted in pairs on a common axle and have different diameters.

In addition, it is advisable to arrange the housings of the planet wheels 14 and 15 in such a manner that they operate as a gear pump (FIGURE 4) which forces the lubricant towards the periphery of the case 12—12a into the throats 25, 26 and 27.

The lubricant is thus, as much as possible, prevented from escaping, in too great a quantity, through the openings 23 of the case 12.

Nevertheless, a part of the lubricant, which takes this path, is brought back by the edge of a peripheral deflector 28 which the case 12 has on its lateral wall at the level of the axles of the planet wheel units and of the balancing runners 19 and 20, into the return passages provided in these axles. The passages 29—30, which pass through the runners, bring the lubricant, by centrifuging, directly from the deflector 28 up to the peripheral throats in the case 12, whilst the axial and radial passages 32 and 33, which are made in the axles 31 of the planet wheel units, lead the lubricant, by centrifuging, into the needls bearings 34 of the planet wheel units.

A small part of the lubricant, which still tends to escape between the deflector 28 and the casing which surrounds the case 12 as closely as possible, is pushed back by a thread 36 provided in the periphery of the case 12.

In the mounting of the differential and of its lubricating system, the lubricant accumulates on the periphery of the case 12 and brakes the rotation of the planet wheels at the starting of the unit. This braking tends to drive, in direct engagement, the shaft 2 by the shaft 1 and ensures the electric starting of the alternator; this, in the case in which the braking current comes exclusively from the alternator, obviates the provision of an auxiliary braking device, which replaces the action of the Foucault-current brake before the electric starting has taken place.

In another arrangement of the invention, the shaft 36 of the rotor of the Foucult-current brake is mounted directly in the wall 37 of a rigid casing 37—37a which surrounds the differential, the said shaft being supported solely overhung by a bearing with, for example, a double row of balls 38—39, and the planet wheel holder is mounted, also overhung, by means of a bearing with, for example, a double row of balls 40—41, on the shaft 2 of the alternator, between the driving pinion of the latter and its bearing 42, in which it pivots in the other opposite wall 37a of the rigid casing.

As the housings of the bearing 38—39 and of the bearing 42 are coaxial and of the same diameter, it is convenient to bore them simultaneously in order to obtain a strict centering, the two parts 37 and 37a of the rigid casing having previously been centered and pinned on each other.

The aforesaid overhung mountings render possible, not only a very compact fitting, but also disengage, on the side of the flange 7, the end of the brake and facilitate its rational cooling.

As regards the case 12, it is advantageously made in two parts 12a and 12b which are centered in relation to each other and reunited at their periphery by bolts 24.

Now, as regards the rotor of the brake, it is advisable to constitute it by a thick ring 43 of ferromagnetic material which surrounds the shaft 36 and which is connected to a hub 44 that is integral with the said shaft, through the intermediary of thin fins 45, which form, between them, large cooling passages 49 and which are slightly resilient in order to be able to compensate the effects of expansions. These fins have, in addition, large surfaces in order to facilitate heat exchanges between the rotor and the cooling air.

Figure 3:
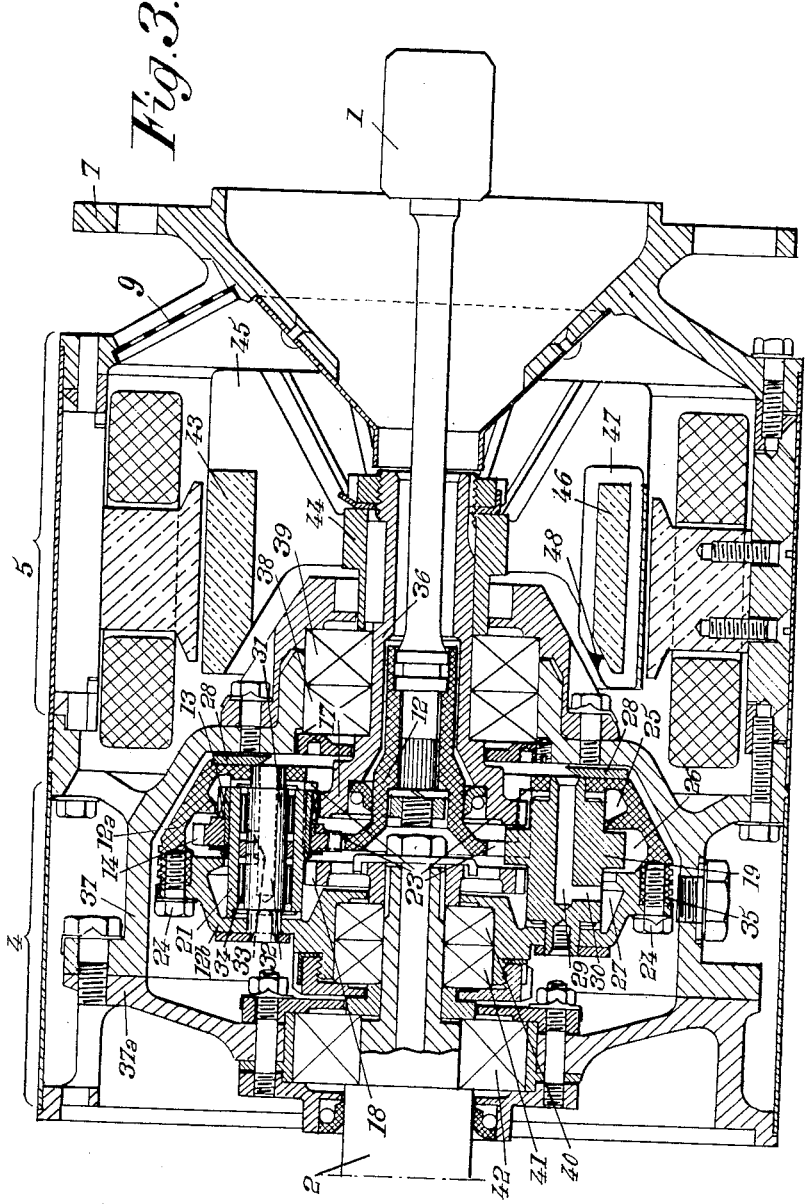
FIGURE 3 is an axial section, on the line III—III of FIGURE 4, of the mechanical arrangement of the differential and of the Foucault-current brake of the same device.

In addition, it is advisable to make, in the ring 43, passages 46 which are parallel to the axis of rotation and pass right through the ring, slightly at the inside of its periphery, and to fit, in each of these passages, an electrical conductor 47 which forms a closed turn, the ends of this conductor being, for example, brought together along the inner edge of the ring 43 and joined together at 48, as shown in FIGURE 3, by welding or brazing at a high temperature.

The conductors 47 may be made of any metal that is a good electrical conductor, preferably of red copper.

Advantageously, the rotor is fitted in such a manner that a part of the cooling air can pass between it and the bearing 38—39 (see FIGURE 1).

Obviously, the invention is not restricted to the embodiment which has been more particularly described with reference to the drawings but relates to all the modifications, for example a modification in which the driven device is not an alternator.

I claim:

1. A device for obtaining electric current at uniform frequency by means of a prime mover running at variable speed, which device comprises, in combination, a driving shaft of substantially variable speed, a driven shaft to be rotated at uniform speed, said driven shaft being in line with said driving shaft, a differential located between said driving shaft and said driven shaft so that said shafts extend on opposite sides of said differential respectively, said differential including an input element and two output elements, said input element being coupled directly with said driving shaft and one of said output elements being coupled directly with said driven shaft, an alternator to supply, at the output thereof, current of uniform frequency, said alternator having its rotor fixed on said driven shaft, and a Foucault current brake variably energized in accordance with variations of the speed of said driving shaft, said Foucault current brake being directly coupled with the other of said output elements and coaxially surrounding a portion of said driving shaft close to said differential.

2. A device for obtaining electric current at uniform frequency by means of a prime mover running at variable speed, which device comprises, in combination, a driving shaft of substantially variable speed, a driven shaft to be rotated at uniform speed, said driven shaft being in line with said driving shaft, a differential located between said driving shaft and said driven shaft so that said shafts extend on opposite sides of said differential respectively, said differential including an input element and two output elements, said input element being coupled directly with said driving shaft and one of said output elements being coupled directly with said driven shaft, an alternator to supply, at the output thereof, current of uniform frequency, said alternator having its rotor fixed on said driven shaft, a Foucault current brake variably energized in accordance with variations of the speed of said driving shaft, said Foucault current brake being directly coupled with the other of said output elements and coaxially surrounding a portion of said driving shaft close to said differential and means for circulating cooling air on said device, said means including an inlet opening opposite said differential and two branches connected to said inlet and passing respectively along said brake and along said alternator.

3. A device according to claim 1, further including a casing surrounding said differential, said generator and said brake, said casing having, round the driving shaft, a flange by means of which it can be fixed to a wall.

4. A device according to claim 3, wherein said casing is perforated, on the one hand at the periphery near the fixing flange and, on the other, at the end near the driven shaft of the alternator, in order to enable currents of cooling air to leave the device after having cooled the differential and the Foucault-current brake and the alternator respectively.

5. A device for obtaining electric current at uniform frequency by means of a prime mover running at variable speed, which device comprises, in combination, a driving shaft of substantially variable speed, a driven shaft to be rotated at uniform speed, said driven shaft being in line with said driving shaft, a differential located between said driving shaft and said driven shaft so that said shafts extend on opposite sides of said differential respectively, said differential including an input element and two output elements, said input element being coupled directly with said driving shaft and one of said output elements being coupled directly with said driven shaft, an alternator to supply, at the output thereof, current of uniform frequency, said alternator having its rotor fixed on said driven shaft, a Foucault current brake variably energized in accordance with variations of the speed of said driving shaft, said Foucault current brake being directly coupled with the other of said output elements and coaxially surrounding a portion of said driving shaft close to said differential, said differential comprising a planet wheel holder driven directly by the driving shaft and at least one pair of planet wheel units journalled in said holder each of said units including two twin planet wheels rigid with each other, one planet wheel of each of said units being in mesh with a corresponding planet wheel of the other unit, said device further comprising a pinion rigid with the shaft of the Foucault current brake in mesh with the other planet wheel of one of said units, and a pinion rigid with said driven shaft in mesh with the other planet wheel of the other of said units.

6. A device for obtaining electric current at uniform frequency by means of a prime mover running at variable speed, which device comprises, in combination, a driving shaft of substantially variable speed, a driven shaft to be rotated at uniform speed, said driven shaft being in line with said driving shaft, a differential located between said driving shaft and said driven shaft so that said shafts extend on opposite sides of said differential respectively, said differential including an input element and two output elements, said input element being coupled directly with said driving shaft and one of said output elements being coupled directly with said driven shaft, an alternator to supply, at the output thereof, current of uniform frequency, said alternator having its rotor fixed on said driven shaft, a Foucault current brake variably energized in accordance with variations of the speed of said driving shaft, said Foucault current brake being directly coupled with the other of said output elements and coaxially surrounding a portion of said driving shaft close to said differential, said differential comprising a planet wheel holder driven directly by the driving shaft and at least one pair of planet wheel units journalled in said holder each of said units including two twin planet wheels rigid with each other, one planet wheel of each of said units being in mesh with a corresponding planet wheel of the other unit, said device further comprising a pinion rigid with the shaft of the Foucault current brake in mesh with the other planet wheel of one of said units, and a pinion rigid with said driven shaft in mesh with the other planet wheel of the other of said units, wherein said planet wheel holder constitutes a case which envelops the wheels forming part of the differential, so as to be able to retain, round the said pinions, the lubricant which is necessary for their operation.

7. A device according to claim 5, wherein the two planet wheels of each unit are forcibly fitted, by a central opening with a polygonal contour, on a socket with a corresponding external contour and with a cylindrical bore.

8. A device according to claim 6, wherein the case formed by the planet wheel holder passes round one of said pinions and is provided, at the periphery of this pinion, with an opening through which said pinion can mesh with the corresponding planet wheel of the differential.

9. A device according to claim 6, wherein the internal peripheral wall of the case forms, at different distances from the axis of said shafts, throats adapted to keep lubricant in contact with rotating members of the differential.

10. A device according to claim 1, wherein the differential includes lubricating means arranged in such a manner that, at the start, the lubricant, which has a suitable viscosity, brakes at least one of the planet wheels so that the driving shaft can transmit a starting torque to the receiving shaft of an electrical generator.

11. A device according to claim 6, wherein said first mentioned planet wheels of said units, which are in mesh with each other, form a gear pump which pushes lubricant towards the periphery of the case formed by the planet wheel holder.

12. A driving device according to claim 6, wherein said Foucault-current brake and said planet wheel holder are each mounted overhung in said case in which the differential is housed.

13. A driving device according to claim 1, wherein the rotor of the Foucault-current brake is constituted by a thick ring of ferromagnetic material provided with passages parallel to the axis of said shaft and which extend right through said ring, slightly on the inside of its periphery, further including, fitted in each of these passages, an electrical conductor forming a turn which is closed on itself and which is made of a metal that is a good electrical conductor.

References Cited in the file of this patent

UNITED STATES PATENTS

| | | |
|---|---|---|
| 2,266,164 | Claytor | Dec. 16, 1941 |
| 2,565,494 | Gilfillan | Aug. 28, 1951 |
| 2,717,524 | Davis | Sept. 13, 1955 |
| 2,750,812 | Mirone | June 19, 1956 |